United States Patent [19]

Nishio

[11] Patent Number: 4,855,726

[45] Date of Patent: Aug. 8, 1989

[54] SIGNAL TRACING APPARATUS FOR LOGIC CIRCUIT DIAGRAMS

[75] Inventor: Seiichi Nishio, Kawasaki, Japan

[73] Assignee: Kabushiki Kaisha Toshiba, Kawasaki, Japan

[21] Appl. No.: 102,494

[22] Filed: Sep. 29, 1987

[30] Foreign Application Priority Data

Sep. 30, 1986 [JP] Japan ................. 61-232337

[51] Int. Cl.⁴ .............................................. G09G 1/16
[52] U.S. Cl. ..................... 340/747; 340/709; 364/488
[58] Field of Search ............. 340/747, 715, 709, 703, 340/723; 364/488, 491, 521

[56] References Cited

U.S. PATENT DOCUMENTS 4,656,603 4/1987 Dunn .................................. 340/747
4,710,763 12/1987 Franke et al. ..................... 340/747

Primary Examiner—David K. Moore
Assistant Examiner—M. Fatahiyar
Attorney, Agent, or Firm—Foley & Lardner, Schwartz, Jeffery, Schwaab, Mack, Blumenthal & Evans

[57] ABSTRACT

In a logic circuit diagram processing apparatus, when an original signal name or an original signal line is designated, all the signal lines associated with the designated signal (i.e. signal lines through which the designated signal is passed; logic elements to which the designated signal lines are connected; signal lines connected to the logic elements to which already-traced signal lines are connected, etc.) are displayed in color or colors, for instance, visually different from that of other signal lines, for providing an easy operator's visual confirmation or visual check of a logic circuit.

18 Claims, 9 Drawing Sheets

FIG.4A

NET TABLE

| SIG.LINE NAME | SOURCE | | DESTINATION | | DISPLAY ATTRIBUTE | COORDINATES |
|---|---|---|---|---|---|---|
| | NODE N. | TERMINAL | NODE N. | TERMINAL | | |
| N1 | DA | OUTPUT | E1 | INPUT 1 | 0 | $x_1, y_8$<br>$x_2, y_8$ |
| N2 | DB | OUTPUT | E1 | INPUT 2 | 0 | $x_1, y_6$<br>$x_2, y_6$ |
| N3 | EN | OUTPUT | E2 | INPUT 1 | 0 | $x_1, y_4$<br>$x_2, y_4$ |
| N4 | CLK | OUTPUT | E2 | INPUT 2 | 0 | $x_1, y_2$<br>$x_2, y_2$ |
| N5 | DC | OUTPUT | E4 | INPUT 2 | 0 | $x_1, y_1$<br>$x_6, y_1$<br>$x_6, y_5$<br>$x_7, y_5$ |
| N6 | E1 | OUTPUT | E3 | INPUT 1 | 0 | $x_3, y_7$<br>$x_4, y_7$ |
| N7 | E2 | OUTPUT | E3 | INPUT 2 | 0 | $x_3, y_3$<br>$x_4, y_3$ |
| N8 | E3 | OUTPUT | E4 | INPUT 1 | 0 | $x_5, y_7$<br>$x_7, y_7$ |
| N9 | E4 | OUTPUT | $\overline{O}$ | INPUT | 0 | $x_8, y_6$<br>$x_9, y_6$ |

FIG.4C

DISPLAY TABLE

| DISPLAY ATTRIBUTE | COLOR |
|---|---|
| 0 | WHITE |
| 1 | RED |

FIG. 4B

NODE TABLE

| NODE NAME | KIND OF NODE | TERMINAL | ASSOCIATED SIG. LINE NAME |
|---|---|---|---|
| DA | INPUT TERMINAL | OUTPUT | N 1 |
| DB | INPUT TERMINAL | OUTPUT | N 2 |
| EN | INPUT TERMINAL | OUTPUT | N 3 |
| CLK | INPUT TERMINAL | OUTPUT | N 4 |
| DC | INPUT TERMINAL | OUTPUT | N 5 |
| E 1 | OR | INPUT 1 | N 1 |
|  |  | INPUT 2 | N 2 |
|  |  | OUTPUT | N 6 |
| E 2 | AND | INPUT 1 | N 3 |
|  |  | INPUT 2 | N 4 |
|  |  | OUTPUT | N 7 |
| E 3 | FLIP-FLOP | INPUT 1 | N 6 |
|  |  | INPUT 2 | N 7 |
|  |  | OUTPUT | N 8 |
| E 4 | AND | INPUT 1 | N 8 |
|  |  | INPUT 2 | N 5 |
|  |  | OUTPUT | N 9 |
| $\overline{0}$ | OUTPUT TERMINAL | INPUT | N 9 |

FIG.5

NET TABLE

| SIG. LINE NAME | SOURCE | | DESTINATION | | DISPLAY ATTRIBUTE | COORDINATES |
|---|---|---|---|---|---|---|
| | NODE N. | TERM. | NODE N. | TERM. | | |
| (S2,S3) N 5 | D C | OUTPUT | E 4 | INPUT 2 | (S4) 0→1 | $x_1, y_1$ <br> $x_6, y_1$ <br> $x_6, y_5$ <br> $x_7, y_5$ |
| N 6 | E 1 | OUTPUT | E 3 | INPUT 1 | 0 | $x_3, y_7$ <br> $x_4, y_7$ |
| N 7 | E 2 | OUTPUT | E 3 | INPUT 2 | 0 | $x_3, y_3$ <br> $x_4, y_3$ |
| N 8 | E 3 | OUTPUT | E 4 | INPUT 1 | 0 | $x_5, y_7$ <br> $x_7, y_7$ |
| (S9) N 9 | E 4 | OUTPUT | $\overline{0}$ | INPUT | (S4) 0→1 | $x_8, y_6$ <br> $x_9, y_6$ |

0 : WHITE
1 : RED

NODE TABLE

| NODE N. | KIND OF NODE | TERM. | ASSOCIATED SIG. LINE NAME |
|---|---|---|---|
| (S5) E 4 | A N D | INPUT 1 | N 8 |
| | | INPUT 2 | N 5 |
| | | OUTPUT | N 9 (S8) |
| (S5) $\overline{0}$ | OUTPUT (S7) TERMINAL | INPUT | N 9 |

FIG.7
DISPLAY TABLE

| DISPLAY ATTRIBUTE | COLOR |
|---|---|
| 0 | WHITE |
| 1 | RED |
| 2 | BLUE |
| 3 | YELLOW |

FIG.8A

NET TABLE (SIG.LINE NAME : N3
TRACE MODE : 0
DISPLAY ATTRIBUTE : 1)

| SIG.LINE NAME | SOURCE | | DESTINATION | | DISPLAY ATTRIBUTE | COORDINATES |
|---|---|---|---|---|---|---|
| | NODE N. | TERMINAL | NODE N. | TERMINAL | | |
| N 1 | D A | OUTPUT | E 1 | INPUT 1 | 0 | $x_1, y_8$ <br> $x_2, y_8$ |
| N 2 | D B | OUTPUT | E 1 | INPUT 2 | 0 | $x_1, y_6$ <br> $x_2, y_6$ |
| N 3 | E N | OUTPUT | E 2 | INPUT 1 | 1 | $x_1, y_4$ <br> $x_2, y_4$ |
| N 4 | CLK | OUTPUT | E 2 | INPUT 2 | 0 | $x_1, y_2$ <br> $x_2, y_2$ |
| N 5 | D C | OUTPUT | E 4 | INPUT 2 | 0 | $x_1, y_1$ <br> $x_6, y_1$ <br> $x_6, y_5$ <br> $x_7, y_5$ |
| N 6 | E 1 | OUTPUT | E 3 | INPUT 1 | 0 | $x_3, y_7$ <br> $x_4, y_7$ |
| N 7 | E 2 | OUTPUT | E 3 | INPUT 2 | 0 | $x_3, y_3$ <br> $x_4, y_3$ |
| N 8 | E 3 | OUTPUT | E 4 | INPUT 1 | 0 | $x_5, y_7$ <br> $x_7, y_7$ |
| N 9 | E 4 | OUTPUT | $\overline{O}$ | INPUT | 0 | $x_8, y_6$ <br> $x_9, y_6$ |

FIG.8B

NET TABLE (SIG.LINE NAME : N4  
TRACE MODE : 1  
DISPLAY ATTRIBUTE: 2)

| SIG.LINE NAME | SOURCE | | DESTINATION | | DISPLAY ATTRIBUTE | COORDINATES |
|---|---|---|---|---|---|---|
| | NODE N. | TERMINAL | NODE N. | TERMINAL | | |
| N 1 | D A | OUTPUT | E 1 | INPUT 1 | 0 | $x_1, y_8$ <br> $x_2, y_8$ |
| N 2 | D B | OUTPUT | E 1 | INPUT 2 | 0 | $x_1, y_6$ <br> $x_2, y_6$ |
| N 3 | E N | OUTPUT | E 2 | INPUT 1 | 1 | $x_1, y_4$ <br> $x_2, y_4$ |
| <u>N 4</u> | CLK | OUTPUT | E 2 | INPUT 2 | <u>2</u> | $x_1, y_2$ <br> $x_2, y_2$ |
| N 5 | D C | OUTPUT | E 4 | INPUT 2 | 0 | $x_1, y_1$ <br> $x_6, y_1$ <br> $x_6, y_5$ <br> $x_7, y_5$ |
| N 6 | E 1 | OUTPUT | E 3 | INPUT 1 | 0 | $x_3, y_7$ <br> $x_4, y_7$ |
| <u>N 7</u> | E 2 | OUTPUT | E 3 | INPUT 2 | <u>2</u> | $x_3, y_3$ <br> $x_4, y_3$ |
| N 8 | E 3 | OUTPUT | E 4 | INPUT 1 | 0 | $x_5, y_7$ <br> $x_7, y_7$ |
| N 9 | E 4 | OUTPUT | $\overline{O}$ | INPUT | 0 | $x_8, y_6$ <br> $x_9, y_6$ |

FIG. 8C

NET TABLE (SIG. LINE NAME : N1
 TRACE MODE : 3
 DISPLAY ATTRIBUTE: 3)

| SIG. LINE NAME | SOURCE | | DESTINATION | | DISPLAY ATTRIBUTE | COORDINATES | |
|---|---|---|---|---|---|---|---|
| | NODE N. | TERMINAL | NODE N. | TERMINAL | | | |
| N1 | DA | OUTPUT | E1 | INPUT 1 | 3 | X1 | y8 |
| | | | | | | X2 | y8 |
| N2 | DB | OUTPUT | E1 | INPUT 2 | 0 | X1 | y6 |
| | | | | | | X2 | y6 |
| N3 | EN | OUTPUT | E2 | INPUT 1 | 1 | X1 | y4 |
| | | | | | | X2 | y4 |
| N4 | CLK | OUTPUT | E2 | INPUT 2 | 2 | X1 | y2 |
| | | | | | | X2 | y2 |
| N5 | DC | OUTPUT | E4 | INPUT 2 | 0 | X1 | y1 |
| | | | | | | X6 | y1 |
| | | | | | | X6 | y5 |
| | | | | | | X7 | y5 |
| N6 | E1 | OUTPUT | E3 | INPUT 1 | 3 | X3 | y7 |
| | | | | | | X4 | y7 |
| N7 | E2 | OUTPUT | E3 | INPUT 2 | 2 | X3 | y3 |
| | | | | | | X4 | y3 |
| N8 | E3 | OUTPUT | E4 | INPUT 1 | 3 | X5 | y7 |
| | | | | | | X7 | y7 |
| N9 | E4 | OUTPUT | $\overline{O}$ | INPUT | 3 | X8 | y6 |
| | | | | | | X9 | y6 |

SIGNAL TRACING APPARATUS FOR LOGIC CIRCUIT DIAGRAMS

BACKGROUND OF THE INVENTION

1. Field of the Invention

The present invention relates to a logic circuit diagram processing apparatus and a method of processing the logic circuit diagram, and more specifically to an apparatus for implementing a signal tracing operation such that signal path lines influenced by a designated original signal can be displayed in a different color, for instance.

2. Description of the Prior Art

Owing to the higher performance of graphic apparatus and lower price of engineering work stations (e.g. by use of a personal computer), recently there have widely been used logic circuit diagram editing apparatus by which a designer can draw or alter a digital logic circuit diagram or an automatic logic circuit diagram generating apparatus by which a logic circuit diagram can be drawn automatically on the basis of connection data (e.g. connection data or connection languages) representative of mutual connection relationships between logic elements.

In these logic circuit diagram processing apparatus, however, there exists a need for checking the influence of a specific signal upon the logic circuit, as when an edited logic circuit is checked again after some days have elapsed or when a logic circuit diagram edited by another person is required to check.

In the prior-art logic circuit diagram processing apparatus, however, the functions are as follows: when a specific signal name is designated, coordinates of the associated signal lines are indicated on a circuit diagram or the associated signal lines are displayed in a different color on a circuit diagram (e.g. "Circuit diagram edit system provided with inquiry function" by Kawamoto, Information Processing Society Japan (IPSJ), DA 16-3, 1983). Therefore, in the case where an influence of a sigal upon a logic circuit is required to trace, the following steps are repeated: an original signal name is designated; the associated signal line is identified on the logic circuit diagram on the basis of a signal line corresponding function; other signal names connected to logic elements to which the associated signal lines are connected are designated, and the above signal line identifications on the logic circuit diagram are repeated on the basis of the signal line corresponding function until the identification reaches the output terminal or memory element of the logic circuit.

In a logic circuit having many stages from the input terminal to the output terminal, however, since signal names should be repeatedly designated while confirming the displayed signal lines, there exist problems such that troublesome work is repeatedly required and therefore mistakes may occur in signal name designation in proportion to an increase in the number of signal name designations, thus lowering the accuracy of a signal tracing operation.

SUMMARY OF THE INVENTION

With these problems in mind, therefore, it is the primary object of the present invention to provide a logic circuit diagram processing apparatus which can implement an accurate signal tracing operation at a high speed in spite of simple operation and a method of processing a logic circuit diagram in the same way.

To achieve the above mentioned object, a logic circuit diagram processing apparatus of the present invention comprises:

(a) a unit for designating an original signal or an original signal line in a logic circuit diagram; (b) a unit for tracing a plurality of signal lines associated with the designated original signal or original signal line and or changing display attribute of the plural traced signal lines from that of the other untraced signal lines; and (c) a unit for displaying the traced signal lines in a way different from the other untraced signal lines.

The signal line tracing a unit is a CPU including a memory unit for executing signal tracing operation and display attribute changing operation in accordance with a program and in cooperation with a net table, a node table and a display attribute table all prepared on the basis a logic circuit to be traced and stored in the memory unit.

The signal lines associated with the designated original signal or line are signal lines through which a designated signal is passed; logic elements to which a designated signal line is connected; and signal lines connected to logic elements to which already-traced signal lines are connected.

The traced signal lines are displayed so as to be visually distinguishable from other untraced signal lines.

To achieve the above-mentioned object, a method of processing a logic circuit diagram according to the present invention comprises the following steps of: (a) designating an original signal name on a logic circuit diagram; (b) looking up the designated original signal in a net table to change a display attribute value corresponding to the designated original signal; (c) looking up a destination node name corresponding to the designated original signal in a node table to check whether kind of node corresponding to the destination node name is an output terminal; (d) if YES, completing the steps; (e) if NO, determining an associated signal line name whose terminal is an output in the node table; (f) looking up the determined associated signal line name in the net table to change a display attribute value corresponding to the associated signal line name; (g) repeating the above steps from (b) to (d) until the kind of node is determined as an output terminal; and (h) displaying the traced signal lines influenced by the designated original signal in a way distinguishable from other untraced signal lines.

When any given original signal line (or signal) is designated on a logic circuit diagram by the signal designating means, the signal tracing means traces other signal lines connected to logic elements with which the original signal line is associated; and further the signal tracing means repeatedly traces the other signal lines connected to logic elements with which the traced signal lines are associated. The signal lines thus traced are displayed in way different from the other signal lines, so that the operator can easily trace signal lines influenced by an any given original signal in spite of a simple operation.

BRIEF DESCRIPTION OF THE DRAWINGS

The features and advantages of the logic circuit diagram processing apparatus according to the present invention will be more clearly appreciated from the following description of the preferred embodiment of the invention taken in conjunction with the accompanying drawings in which:

FIG. 4A is a net table of the logic circuit shown in FIG. 3, which is used in tracing an original signal;

FIG. 4B is a node table of the same logic circuit, which is used in cooperation with the net table shown in FIG. 4A;

FIG. 4C is a display attribute table showing an example of display attribute;

FIG. 5 is a partial net table and a partial node table for assistance in explaining an example of signal tracing operation as shown by thick lines in FIG. 3;

FIG. 7 is a display table showing a second embodiment of display attribute;

FIG. 8A is a net table for assistance in explaining a trace mode "0" (tracing along only signal lines);

FIG. 8B is a net table for assistance in explaining a trace mode "1" (tracing to a flip-flop circuit); and FIG. 8C is a net table for assistance in explaining a trace mode 3 (tracing to an output terminal).

DETAILED DESCRIPTION OF THE PREFERRED EMBODIMENTS

An apparatus of the present invention will be described hereinbelow in detail with reference to the attached drawings.

Figure 1:
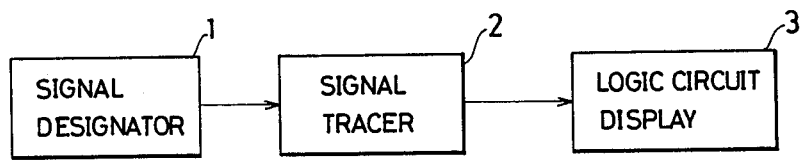
FIG. 1 is a schematic block diagram of the logic circuit diagram processing apparatus of the present invention.

FIG. 1 shows a basic block diagram of the apparatus which comprises a signal designator 1, a signal tracer 2, and a logic circuit diagram display 3.

The signal designator is a key board input unit, a mouse, etc., for instance, for designating an original signal to be traced for investigation on the basis of the operator's operation. The designated signal name (or signal line name) is applied to the signal tracer 2.

Figure 2:
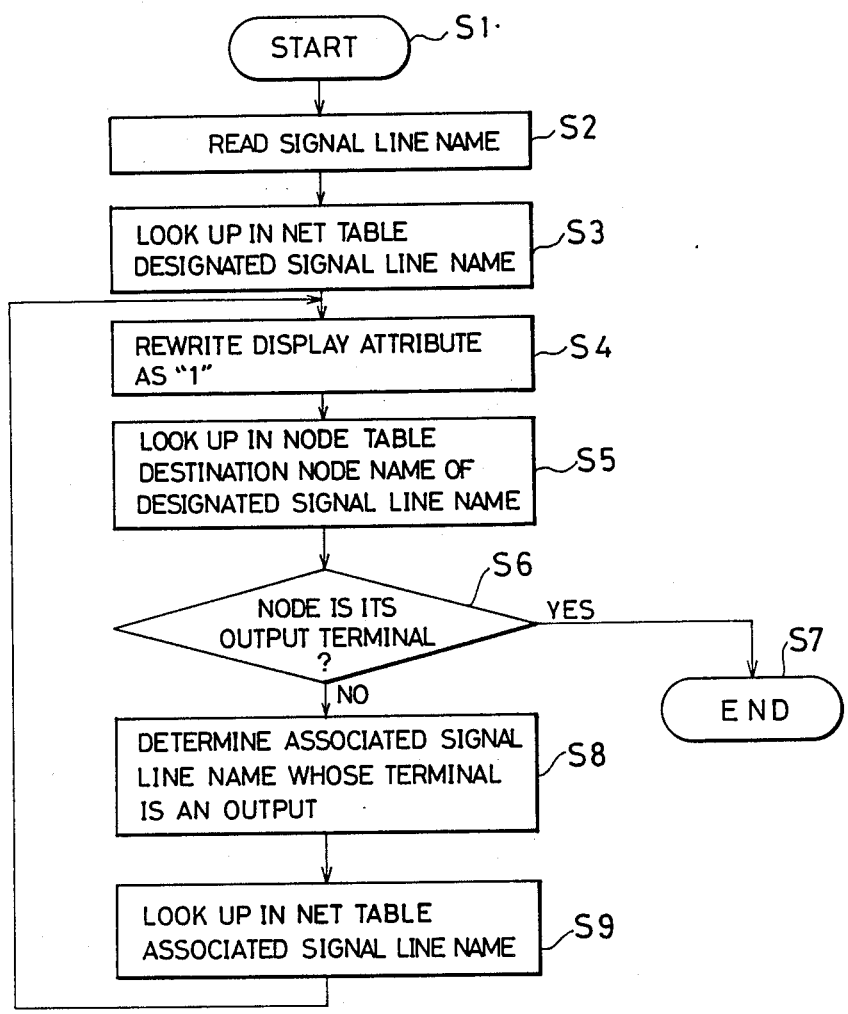
FIG. 2 is a flowchart showing a signal tracing procedure of the first embodiment of the present invention.

The signal tracer 2 is made up of a CPU and a memory unit, etc., which executes a tracing program as shown in FIG. 2 with reference to a net table, a node table and a display attribute table as shown in FIGS. 4A, 4B and 4C and stored in a memory unit in order to trace an original signal.

Figure 3:
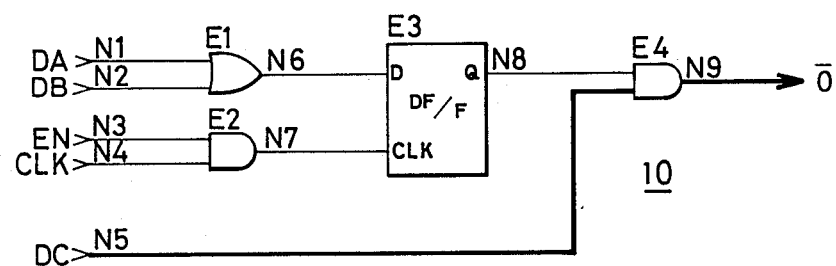
FIG. 3 is a block diagram showing an example of logic circuits for assistance in explaining the signal tracing operation of the present invention.

The logic circuit diagram display 3 displays a logic circuit 10 as shown in FIG. 3 and thick signal lines determined by various tables stored in the signal tracer 2, for instance. In this embodiment, signal lines and logic elements arranged on traced paths influenced by an original signal can be displayed in a color different from that of other signal lines and the logic elements.

By way of example, an assumption is made that a logic circuit 10 as shown in FIG. 3 is traced. The logic circuit 10 is made up of a two-input OR gate E1 to which two data DA and DA are inputted, a two-input AND gate E2 to which an enable signal EN and a clock signal CLK are inputted, a D flip-flop having a data input terminal to which an output of the gate E1 is given and a clock input terminal to which an output of the AND gate E2 is given, and a two-input AND gate E4 to which an Q output and a data DC are inputted, as shown in FIG. 3. Further, these logic elements E1 to E4 are connected to each other by signal lines N1 to N9.

When these logic elements are designated and connected as shown in FIG. 3, the net table as shown in FIG. 4A and the node table as shown in FIG. 4B are automatically prepared in the signal tracer 2. Further, the display table as shown in FIG. 4C is designated by the operator.

The net table stores signal line names of each signal line N1 to N9, node names and classification (input/output) of terminals connected to the input side (source) and the output side (destination), display attribute, and coordinates of a start point, a bent point, and an end point of each signal line N1 to N9.

The node table stores node names, the kind of nodes, terminal classification (input/output), and associated signal lines. The node names are data DA to DC, enable signal EN, clock signal CLK, logic elements E1 to E4 and an output terminal 0.

The display attribute table stores colors of signal lines to be displayed in accordance with each display attribute value ("0" or "1")

First Embodiment

Signal tracing operation is executed in accordance with the tracing program as shown in FIG. 2 and with reference to various tables as shown in FIGS. 4A, 4B and 4C.

That is, a CPU in the signal tracer 2 starts a tracing operation in step S1, and reads a signal line name corresponding to a designated original signal to be traced from the signal designator 1 in step S1. Then, the CPU proceeds to step S3 to look up a column of the designated signal line name listed in the net table, and rewrites the display attribute value in the corresponding column as '1' in step S4. Thereafter, the CPU proceeds to step S5 to obtain a destination node name in the same column, and looks up a column corresponding to the obtained node name in the node table.

Thereafter, in step S6, the CPU determines whether the kind of node in the same column of the node table is an output terminal or not. If YES, the CPU proceeds to step S7 to complete the tracing program. In contrast with this, if NO in step S6, the CPU proceeds to step S8 to obtain an associated signal line name whose terminal is an output in the same column, and looks up a column corresponding to the associated signal line name obtained in step S9 in the net table, returning to step S4 to repeat the same processings.

With reference to FIG. 5, an example will be described hereinbelow. When a data DC is selected by the signal designator 2 as an original signal to be traced. The signal line N5 is read by the signal tracer 2 in step S2. The CPU in the signal tracer 2 looks up N5 (signal line name) in the net table in step S3 and changes the display attribute value from "0" to "1" in the same colunn in step S4. The CPU obtains E4 (destination node name) in the same column in the net table and then looks up E4 (destination node name) in the node table in step S5. The CPU checks whether E4 is an output terminal in the kind of node in step S6. Since the kind of node of E4 is AND. The CPU obtains an associated signal line name N9 whose terminal is an output in step S8. Subsequently. The CPU looks up N9 in the net table again and changes the display attribute value from "0" to "1" in the same column of N9 in step S4. The CPU obtains 0 (destination node name) in the same column in the net table and then looks up 0 (destination node name) in the node table in step S5. The CPU checks whether 0 is an output terminal in step S5. Since 0 is an output terminal, CPU completes the program in step S7.

Therefore, the display attribute value is changed from "0" to "1" in the column N5 and N9 of the net table. That is, the logic circuit 10 displayed on the logic circuit display 3 is such that the signal lines N5 and N9 are red and the other signal lines N1 to N4 and N6 to N8 are white at the end of the signal tracing operation.

As described above, in the above embodiments, when the operator designates an original signal required to check the influence thereof upon the logic circuit, he can recognize signal lines or paths influenced by the original signal without need of any other additional operations, that is, it is possible to confirm the flow routes of the original signal in spite of a simple operation.

Second Embodiment

The second embodiment of the present invention will be described. In this embodiment, any signal trace end can freely be selected by the operator from among logic gates, memory elements (e.g. flip-flop circuit), and output terminal. Further, the display colors of the signal lines are the four colors as shown in FIG. 7. Therefore, it is possible to simultaneously display three signal traced paths related to three original signals in different colors.

Figure 6:
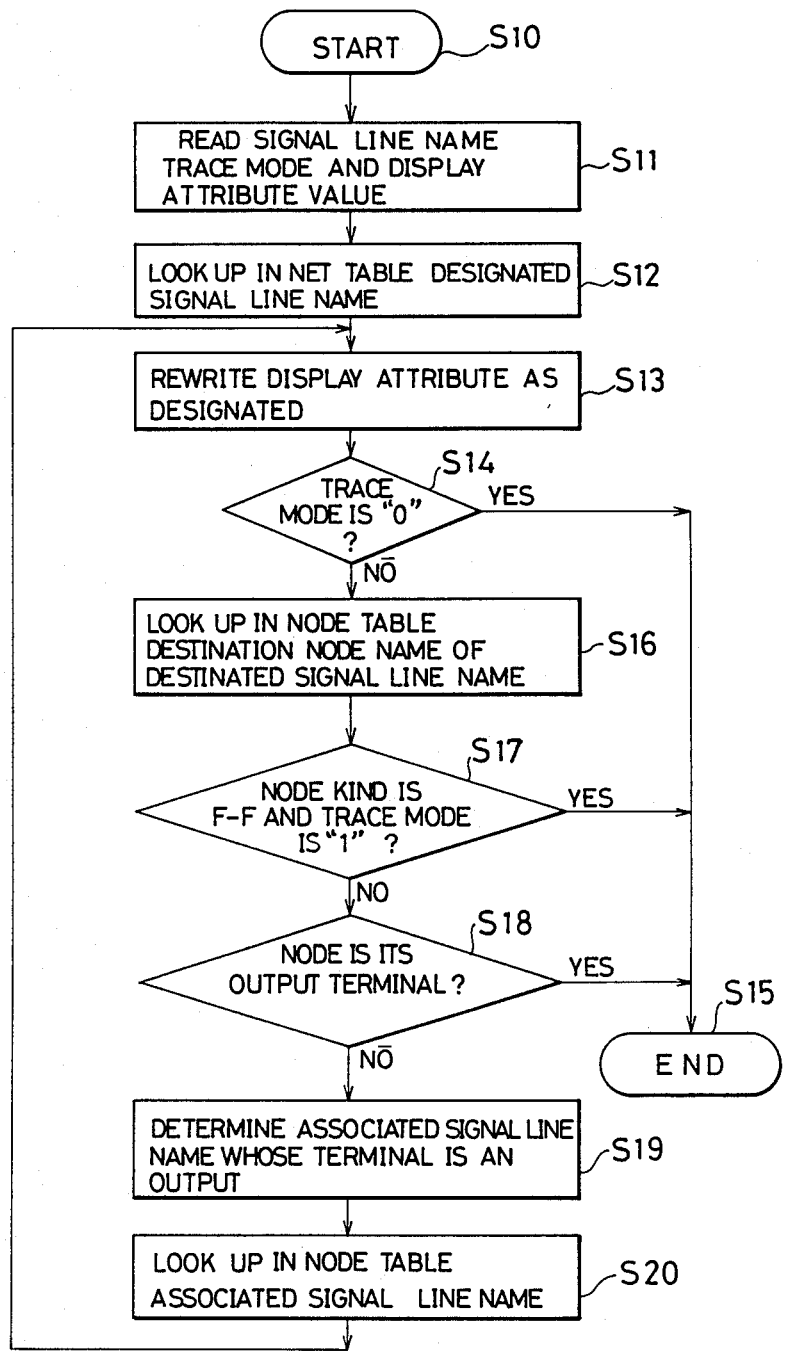
FIG. 6 is a flowchart showing a signal tracing procedure of the second embodiment of the present invention.

FIG. 6 shows a tracing program related to this second embodiment. The CPU of the signal tracer 2 starts to execute the program in step S10 and reads in step S11 a signal line name corresponding to a designated original signal required to trace, a display attribute value (e.g. display color) related to the traced paths, and a tracing mode from the signal designator 1.

Further, in this embodiment, if the tracing mode value is "0", only the signal line corresponding to the designated original signal is traced; if "1", the signal lines to a flip-flop circuit are traced; if other, the signal lines to the output terminal are traced.

After the step S11, CPU proceeds to step S12 to look up the designatd signal line name in the net table (FIG. 4A) and changes the display attribute value of the signal line name to a designated display attribute value in step S13, proceeding to step S14. In step S14, it is determined whether the trace mode value is "0" or not. If "0", CPU immediately proceeds to step S15 to complete the tracing program.

In contrast with this, if NO in step S14, the CPU proceeds to step S16 to obtain a destination node name in the same column, and looks up a column corresponding to the obtained node name in the node table. Thereafter, the CPU proceeds to step S17 to determine whether the tracing mode is "1" and the node kind of the node name is flip-flop circuit or not.

If the result is YES, the current program ends at step S15. In contrast with this, if NO, the CPU proceeds to step S18 to determine whether the node kind is an output terminal or not.

If the node kind is an output terminal, the CPU proceeds to step S15 to complete the signal tracing operation. On the other hand, if not an output terminal, the CPU obtains an associated signal line name whose terminal is an output in the same column in step S19, thereafter looks up a column corresponding to the associated signal line name obtained in step S20 in the net table, returning to the step S13.

In the above description, an assumption is made that the signal line name N3, the trace mode value "0" and the display attribute value "1" are designated in the logic circuit 10 shown in FIG. 3. In this case, the display attribute of the signal line N3 is changed to "1" as shown in FIG. 8A, and the tracing operation ends immediately because the tracing mode value is "0" in step S14.

Thereafter, assumption is made that the signal line name N4, the tracing mode value "1" and the display attribute value "2" are designated in a net table shown in FIG. 8A. In this case, after the display attribute of the signal line N4 has been changed to "2", the net table and the node table are looked up in sequence, so that the signal line N7 is traced and the display attribute thereof is changed to "2" as shown in FIG. 8B. At this moment, since the trace mode value is "1", the signal tracing operation ends when the tracing reaches the flip-flop circuit in step S17.

As described above, the net table TAB 2 is altered as shown in FIG. 8B. Thereafter, when the signal line name N1, the tracing mode value "2" and the display attribute value "3" are designated, the net table and mode table are looked up alternately, until the tracing operation reaches an output terminal, to change the display attribute values of the signal lines N1, N6, N8, and N9 to "3". As a result, the net table changes as shown in FIG. 8C.

As the result, on the logic circuit diagram display 3, the signal lines N2 and N5 not traced are displayed in white; the signal line N3 traced at the first tracing is displayed in red; the signal lines N4 and N7 traced at the second tracing are displayed in blue; and the signal lines N1, N6, N8, and N9 traced at the last tracing are displayed in yellow.

Therefore, in the above embodiment, it is possible to display a plurality of tracing results in plural modes on the same display picture in spite of a simple operation for providing an easy operator's confirmation. Therefore, when the designation is appropriately selected, it is possible to display paths of data signal group and those of control signal group (e.g. clock signal, enable signal) in different colors on the same display picture.

Other Embodiments

Without being limited to the above first and second embodiments, the present invention can be modified as follows:

(1) In the above description, the destination node and the output terminal at each node are both one in number. However, it is of course possible to apply the present invention to logic circuits including plural destination nodes and plural output terminals. In this case, all the destination nodes and all the output terminals can be traced.

(2) in the case of logic circuits including a loop, it is preferable to raise a flag when a round of tracing operation ends.

(3) In the above embodiments, the signal is traced from the input side to the output side. However, it is also possible to trace the signal from the output side to the input side. In this case, the way of looking up in the two tables 2 is reversed.

(4) It is also possible to limit the number of stages to be traced, by designating the trace end at a point located before a logic element arranged at the third stage from an original signal, for instance.

(5) In displaying the signal lines (display attribute) along the traced paths in different manner from the other signal lines, it is possible to change the thickness of lines, the kind of lines (dashed line, actual line, dot-dashed line, etc.), the lighting mode (blinking display), etc. in addition to the above change of color.

As described above, according to the present invention, it is possible to display signal lines influenced by an original signal along tracing paths in different way from the other signal lines in spite of a simple operation such that the operator designates only a signal required to be traced. Therefore, it is possible to provide a logic circuit diagram processing apparatus which can facilitate operator's signal path confirmation work in a logic circuit diagram.

What is claimed is:

1. A signal tracing apparatus for a logic circuit diagram which comprises:
   (a) means for designating an original signal or an original signal line in a logic circuit diagram;
   (b) means for tracing a plurality of signal lines associated with the designated original signal or original signal line and for changing a display attribute of the plurality of traced signal lines from that of other untraced signal lines; and
   (c) means for displaying the traced signal lines in a way visually distinguishable from the other untraced signal ines in a logic circuit diagram in accordance with the display attribute.

2. The apparatus as set forth in claim 1, wherein said original signal designating means is a key board.

3. The apparatus as set forth in claim 1, wherein said original signal designating means is a mouse.

4. The apparatus as set forth in claim 1, wherein said signal line tracing means is a CPU including a memory unit for executing the signal tracing operation and the display attribute changing operation in accordance with a program stored in the memory unit and in cooperation with a net table, a node table and a display attribute table all prepared on the basis of a logic circuit to be traced and stored in the memory unit.

5. The apparatus as set forth in claim 4, wherein the net table lists relationships between signal line names, source node names, kinds of source terminal, destination node names, kinds of destination terminal, display attribute value and coordinates.

6. The apparatus as set forth in claim 4, wherein the node table lists relationships between node names, kinds of nodes, kinds of terminal and associated signal line names.

7. The apparatus as set forth in claim 1, wherein a plurality of the traced signal lines are signal lines through which a designated signal is passed; logic elements to which a designated signal is passed; logic elements to which a designated signal line is connected; and signal lines connected to logic element to which already-traced signal lines are connected.

8. The apparatus as set forth in claim 1, wherein said displaying means changes color of the traced signal lines.

9. The apparatus as set forth in claim 1, wherein said displaying means changes thickness of the traced signal lines.

10. The apparatus as set forth in claim 1, wherein said displaying means displays the traced signal lines by ˜hing said traced signal line.

11. The apparatus as set forth in claim 10, wherein said displaying means changes line type of said traced signal line to solid, broken and chain lines.

12. The apparatus as set forth in claim 1, wherein a signal line is traced beginning from a designated original signal line to a logic gate.

13. The apparatus as set forth in claim 1, wherein signal lines are traced beginning from a designated original signal line to a storage element.

14. The apparatus as set forth in claim 1, wherein signal lines are traced beginning from a designated original signal line to an output terminal.

15. The apparatus as set forth in claim 1, wherein signal lines are traced from an input side to an output side in a logic circuit.

16. The apparatus as set forth in claim 1, wherein signal lines are traced from an output side to an input side in a logic circuit.

17. A method of tracing signals in a logic circuit diagram which comprises the following steps of:
   (a) designating an original signal name on a logic circuit diagram;
   (b) looking up the designated original signal in a net table to change a display attribute value corresponding to the designated original signal;
   (c) looking up a destination node name corresponding to the designated original signal in a node table to determine whether the kind of node corresponding to the destination node name is an output terminal;
   (d) if the result of the determination in step (c) is YES, completing the remaining signal tracing operation;
   (e) if the results of the determination in step (c) is NO, determining an associated signal line name whose terminal is an output in the node table;
   (f) looking up the determined associated signal line name in the net table to change a display attribute value corresponding to the associated signal line name;
   (g) looking up a destination node name corresponding to the associated signal line name in a node table to determine whether the kind of node corresponding to the associated node name is an output terminal;
   (h) repeating the above steps from (e) to (g) until the kind of node is determined as an output terminal;
   (i) displaying the traced signal lines influenced by the designated original signal in a way visually distinguishable from other untraced signal lines in a logic circuit diagram in accordance with the display attribute.

18. The method as set forth in claim 17, which further comprises the following steps of:
   (j) designating trace modes from a designated original signal line to any one of a logic gate, a storage element, an external terminal, and a designated depth;
   (k) changing a display attribute value in accordance with the designated display attribute value;
   (l) determining whether a current tracing operation, successively from the original, reaches an element designated in trace mode;
   (m) if the result of the determination in step (1) is YES, ending the tracing operation; and
   (n) if the result of the determination in step (1) is NO, repeating the tracing operations until the tracing operation reaches an element which was designated in the trace mode.

* * * * *